United States Patent
Lutz et al.

[15] 3,660,723
[45] May 2, 1972

[54] CURRENT TRANSFER CIRCUIT AS PART OF HIGH VOLTAGE DC CIRCUIT

[72] Inventors: Michael A. Lutz, Los Angeles; Willis F. Long, Thousand Oaks, both of Calif.

[73] Assignee: Hughes Aircraft Company, Culver City, Calif.

[22] Filed: Mar. 9, 1971

[21] Appl. No.: 122,395

[52] U.S. Cl. .................................... 317/11 C, 307/136
[51] Int. Cl. ............................................. H02l 7/22
[58] Field of Search ............. 317/11 C, 11 A, 11 E; 307/136; 200/144 AP

[56] References Cited

UNITED STATES PATENTS

| | | | |
|---|---|---|---|
| 2,849,659 | 8/1958 | Kesselring | 317/11 A |
| 2,859,400 | 11/1958 | Kesselring | 317/11 A |
| 3,198,986 | 8/1965 | Luehring et al. | 317/11 E |
| 3,309,570 | 3/1967 | Goldberg | 317/11 A |

Primary Examiner—James D. Trammell
Attorney—W. H. MacAllister, Jr. and Allen A. Dicke, Jr.

[57] ABSTRACT

The current transfer circuit transfers current in a high voltage DC circuit breaker from an in-line switching device which carries the current in normal conduction to a shunt current interrupter which is capable of increasing the breaker impedance to break the high voltage DC circuit. The current transfer device employs first and second serially connected in-line switches, the first of which has a serially connected precharged capacitor, switch, and inductor paralleled therearound to force commutate the first in-line switch to transfer current to the shunt current interrupter. The first switch and the forced commutation equipment need only be of sufficient voltage rating to withstand the initial conduction voltage across the shunt current interrupter. Opening of the second switch isolates the first switch and the forced commutation equipment from the line voltage.

16 Claims, 4 Drawing Figures

Michael A. Lutz,
Willis F. Long,
INVENTORS.
BY
ALLEN A. DICKE, Jr.,
AGENT.

CURRENT TRANSFER CIRCUIT AS PART OF HIGH VOLTAGE DC CIRCUIT

BACKGROUND

This invention is directed to a current transfer circuit which forms part of a high voltage DC circuit breaker and transfers current from an in-line device to a shunt current interrupter in the high voltage DC circuit breaker.

Present understanding of a suitable device to act as a high voltage DC circuit breaker comprises the employment of two parallel structures. The first structure is an in-line switch with low impedance when closed, and sufficiently high impedance when open to stand off the voltage of the circuit in an open circuit situation. This switch is generally considered the in-line switching device and carries the normal circuit current. In parallel to it, the second device is a system which increases the impedance of the circuit breaker to progressively reduce current at a suitable rate, in accordance with circuit reactance, to finally stop current flow without exceeding tolerable circuit voltages.

There are a number of devices for increasing the circuit impedance, after the current is transferred from the in-line switching device to the impedance-increasing device. Several devices for increasing the impedance of the circuit breaker are shown in: Kenneth T. Lian U.S. Pat. No. 3,534,226, granted Oct. 13, 1970, entitled "Sequential Switching Circuits"; application Ser. No. 45,147, filed June 10, 1970, by Kenneth T. Lian and Willis F. Long for "Consecutive Crowbar Circuit Breaker"; application Ser. No. 45,460, filed June 11, 1970, by Michael A. Lutz for "Series Sequential Circuit Breaker"; application Ser. No. 122,396, filed concurrently herewith, by Wolfgang Knauer, entitled "Impedance-Increasing Method and Apparatus as Part of a High Voltage DC Circuit Breaker". Each of these disclosures is incorporated herein in its entirety by this reference. Each of these inventions is directed to means for increasing circuit impedance, after current is transferred to the impedance-increasing means. Each of these inventions discloses an in-line device which is normally closed to provide a low impedance current path during normal conduction.

The problem of transferring current from an in-line device to an impedance-increasing device is that, even in the low impedance state, the impedance-increasing device has a non-zero voltage drop and this requires a substantial arcing voltage drop across the in-line device as it opens, in the absence of any other means for transferring the current. If a single crossed-field switch is used as the switch device in an impedance-increasing device, the initial voltage drop thereacross is likely to be in the order of 1,000 volts. If serially connected crossed field switches are required to withstand the full voltage, this initial voltage drop thereacross is appropriately multiplied. If such voltage drop is taken in the arc of an opening in-line device, a tremendous amount of energy is generated in the in-line device, which energy must be dissipated.

This invention is directed to a circuit by which current can be transferred from an in-line device having a fairly low arc voltage, by circuit components which need not withstand the entire line voltage.

SUMMARY

In order to aid in the understanding of this invention, it can be stated in essentially summary form that it is directed to a current transfer circuit which transfers current from an in-line switching device to an impedance-increasing device, the whole being incorporated in a high voltage DC circuit breaker. The in-line device comprises first and second serially-connected switches for normal current flow. The current transfer circuit comprises the first switch, together with a precharged capacitor, a switch, and an inductance connected around the first switch so that, when the first switch is opened, discharge of the capacitor in parallel thereto through the inductance causes a current zero in the first switch, so that the first switch is rendered nonconductive and develops sufficient voltage thereacross to transfer all current flow to the impedance-increasing circuit. Thereupon, the second switch ceases conducting by either having been previously opened and arcing or just-now opened, so that the second switch can hold off a major portion of the voltage. Then, the impedance-increasing device of the circuit breaker can increase circuit impedance.

Accordingly, it is an object of this invention to provide a circuit for offswitching direct current which circuit includes an in-line switching device which incorporates a circuit which causes transfer of line current to impedance-increasing means. It is a further object to provide a line interrupter which comprises first and second serially connected line switches which carry the normal line current. It is still another object to provide a high recovery rate line switch having transfer circuitry which transfers the circuit current to impedance-increasing means. It is still another object to provide a second line switch which has a high voltage holdoff to hold off the line voltage during and after increasing impedance in the impedance-increasing portion of the circuit breaker is accomplished.

Other objects and advantages of this invention will become apparent from a study of the following portion of the specification, the claims, and the attached drawings.

DESCRIPTION

Figure 1:
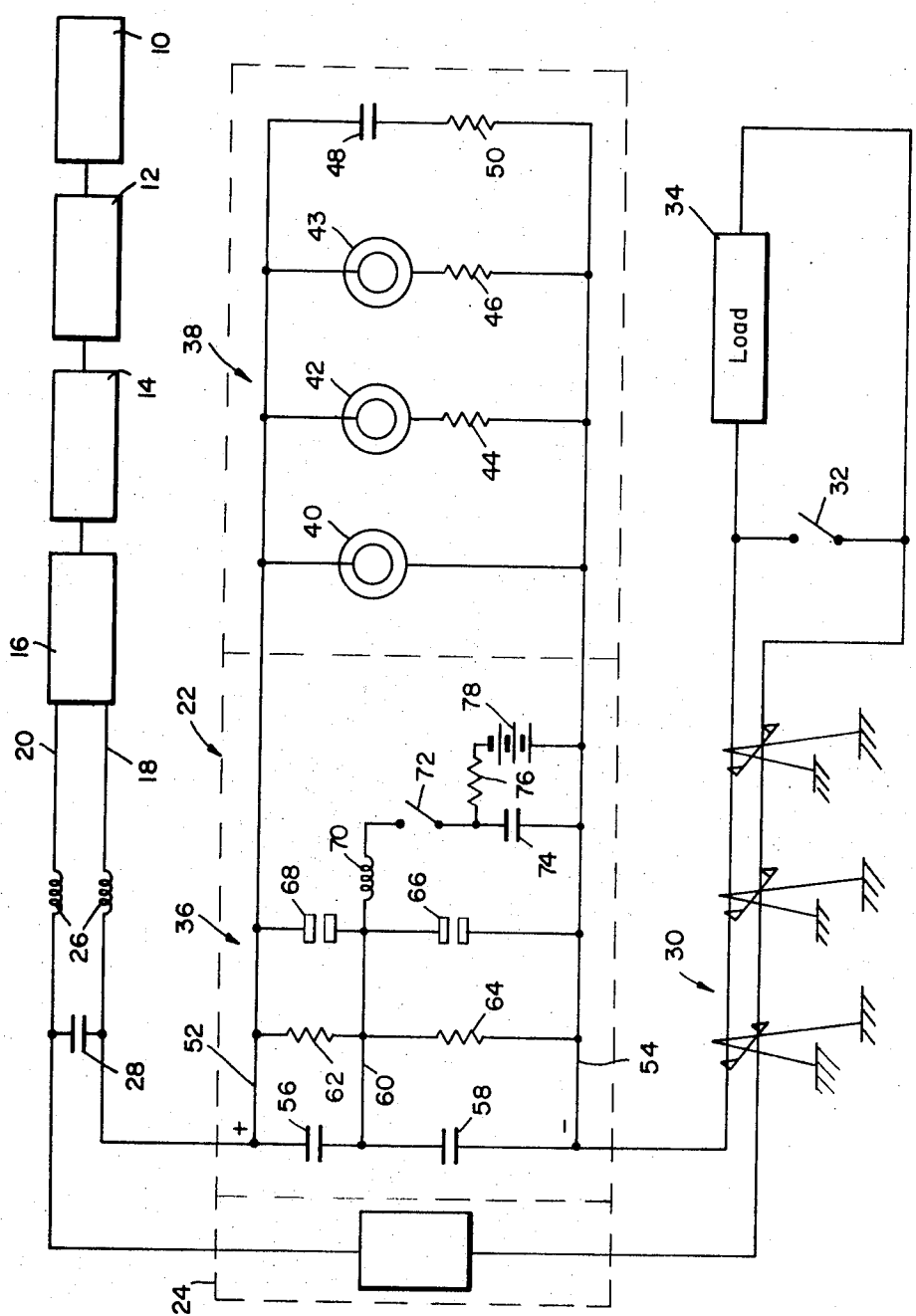
FIG. 1 is a schematic electric circuit showing the circuit breaker for offswitching direct current of this invention.

Referring to FIG. 1, the DC power which is to be off-switched by the circuit breaker having the current transfer circuit of this invention is conventionally derived at a power source 10 which delivers power to an AC generator 12. Generator 12 delivers its output to transformer 14 by which the voltage is raised to suitable transmission line voltage. From the transformer, the power is rectified by rectifier 16. Rectifier 16 has positive and negative output lines 18 and 20 respectively. Inductances 26, connected in both of the lines and capacitance 28 connected between the lines serve as conventional DC filtering and smoothing equipment. They are preferably connected at the output of the rectifier, as shown.

Circuit breaker 22 is serially connected in line 18 between the rectifier 16 and transmission system 30, while an identical circuit breaker 24 is connected in line 20 therebetween. In high voltage DC systems, it is customary to have a line potential such that one line is above ground potential, while the other is below. This equalizes the amount of transmission line insulation between the two lines and ground. For this reason, the two circuit breakers 22 and 24 are required, one in each line. Either one of the lines, through the transmission system or at the load, may fault to each other, as by exemplary fault switch 32, or can fault to ground. Thus, independent line protection is necessary, should a fault to ground occur, rather than the interline fault indicated at 32. However, in either type of fault, a circuit breaker is necessary. Additionally, the breakers 22 and 24 can be opened and closed for ordinary line switching under load. No fault is necessary for them to be operable.

Each of the circuit breakers 22 and 24 has conventional fault detection equipment associated therewith, as well as conventional programming circuitry to operate the circuit breaker through its breaking cycle. Thus, conventional fault detection and circuit breaker operating equipment is included. Load 34 is connected at the output of transmission line 30.

Circuit breaker 22 comprises the line switches with their current transfer circuit, illustrated at 36, and impedance-increasing means 38. The impedance-increasing means 38 can be any of the impedance-increasing means described above. It is emphasized that the sequential switching means illustrated is merely one example of an impedance-increasing system to which the line current is transferred for increasing line impedance and interruption. The sequential switching means illustrated in U.S. Pat. No. 3,534,226 comprises first, second, and third crossed field tubes 40, 42, and 43, the latter two each having an energy-absorbing resistor 44 and 46, respectively, connected in series therewith. Crossed field tube 40 and these series combinations are connected across buses 52 and 54 in parallel with the current transfer circuit 36. Also connected in parallel therewith is a terminal surge-absorbing capacitor 48, together with its series connected energy-absorbing resistor 50.

The sequential switching system 38 is one of those illustrated in U.S. Pat. No. 3,534,226, and any one of the species of sequential systems disclosed in that patent can be employed as a means 38. As described in that patent, more crossed field tubes and resistances, or less, can be employed, depending upon circuit constants, so that a sequential switching means can progressively insert more resistance into the circuit to reduce and stop current and limit the peak voltage surges.

Furthermore, it is clear that the switches in the impedance-increasing circuit can be any convenient type. Crossed-field tubes are described, because they can offswitch against a DC current. Since crossed-field switches have a particular standoff voltage for a particular design, it may be necessary to use several of them in series to withstand the line voltage times the over voltage factor upon offswitching. Other offswitching devices, such as high vacuum tetrodes, can be employed, but crossed-field tubes are described as being illustrative and operative. The entire disclosures of U.S. Pat. Nos. 3,534,226, application Ser. No. 45,147, application Ser. No. 45,460, and application Ser. No. 122,396, filed concurrently herewith, are incorporated herein by this reference, so that the several species of the impedance-increasing circuits described therein are within the scope of the claims herebelow.

The crossed field tubes employed as offswitching devices 40, 42 and 43 herein are described in detail in U.S. Pat. No. 3,534,226. It is clear that, in operation, the crossed field tubes 40, 42, and 43 must have an adequate voltage buildup thereacross in order for them to become conducting. Voltage on the order of 1,000 volts is necessary for conduction in such a crossed field tube, and the line switches and current transfer circuit 36 by which such a voltage rise and current transfer are accomplished within this environment is the subject matter of this invention.

As seen in FIG. 1, grading capacitors 56 and 58 are serially connected between buses 52 and 54. Their center point is connected to voltage-divided line 60. As it later becomes apparent, it is desirable to hold the voltage of voltage-divided line 60 close to that of one of the buses, in this case bus 54, so that the current transfer circuit can be built of relatively low voltage components. Thus, in order to divide the voltage on a basis of about 1 to 50, allowing for safety factor, in the example below, capacitor 56 is 0.0002 microfarads, while capacitor 58 is 0.01 microfarads. These capacitors serve to divide voltage pulses. For lone term DC voltage division, voltage dividing resistors 62 and 64 are serially connected and are respectively connected between lines 52, 60, and 54. Again, in order to divide the voltage on a basis of 1 to 50, in the preferred example, the resistance 62 has a preferred value of $5 \times 10^8$ ohms, while resistance 64 has a value of $10^7$ ohms. The first and second serially-connected in-line switches 66 and 68 are respectively connected between lines 54, 60, and 52, so that their center point is connected to the voltage-divided line 60.

First switch 66 is of such character that it has a high voltage recovery rate. Suitable recovery rates are found in vacuum relays, such as in Allis Chalmers' part No. VSC-15. Since this type of relay cannot interrupt currents of the magnitude found in DC transmission systems, the parallel circuit of inductance 70, third switch 72, and capacitor 74 is required to drive the current through first switch 66 to zero.

Figure 2:
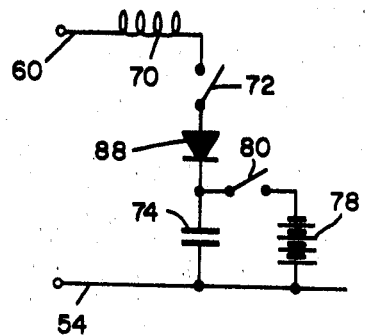
FIG. 2 is a schematic electric circuit showing alternative circuitry for part of the circuitry shown in FIG. 1.

Serially connected resistance 76 and power supply 78 are connected across capacitor 74 so that capacitor 74 is charged through resistance 76. As an alternative to resistance 76, which permits permanent connection of the power supply 78 to charge capacitor 74, a switch 80 can be employed, as indicated in FIG. 2. Switch 80 is only closed during the time when charging of capacitor 74 is desired, which is during the time when switch 72 is nonconductive.

First switch 66, together with its commutating means, causes the current transfer. It is seen that, since the potential of voltage divided line 60 with respect to line 54 is only about 1/50 of the potential between the buses 52 and 54, the components of this current transfer circuit need not withstand the entire voltage between the buses 52 and 54, but need only withstand about 7 KV. Components having 10 KV capability are used for safety factor. As is later explained, the opening of second switch 68 isolates the current transfer portion from the peak voltage of a fully opened breaker, so that relatively low voltage components are useful. Other types of switches can be employed as first switch 66, it being noted that they must not be destroyed by short term arcing, and that they need only withstand the voltage necessary to transfer the current into the impedance-increasing device 38. This voltage is not much greater than the conduction voltage of the crossed-field tubes.

Second switch 68 can be any kind of, or series of, device capable of continuously carrying the line current at low impedance when closed, opening within a few milliseconds and holding off a high voltage when it is opened. Since there is brief or even no current flow through second switch 68 when it is opening, minimum arcing occurs. Thus, a standard circuit breaker has more capability than is required, because such has an interruption capability. Devices without an interruption capability are satisfactory. One type of device which is suitable is a Westinghouse standard circuit breaker, Type 1150 SF 10000. This circuit breaker is rated for 115 KVRMS at 2,000 amperes continuous current. Second switch 68 could alternatively be an Allis Chalmers vacuum relay, as identified above, modified for faster actuation.

Going now to specific values as an example of the invention, and describing its operation in connection with that set of specific values, first switch 66 is a vacuum relay, while second switch 68 is a standard circuit breaker. Assuming a maximum continuous line current not exceeding 2,000 amperes and a peak fault current of 4,000 amperes, exemplary values of specific components in current transfer circuit 36 are given in the table below. With a 200 KV operating voltage, the circuit breaker 22 is designed to withstand a surge voltage of 340 KV. Despite this high rating, the components in the main part of current transfer circuit 36 are not subjected to this high voltage, as seen by the table below and the following operating description. Of course, different component values would be appropriate for systems operating at other levels.

TABLE

| Reference Character | Item | Value |
| --- | --- | --- |
| 56 | capacitor | 0.0002 microfarads, 350 KV |
| 58 | capacitor | 0.01 microfarads, 10 KV |
| 62 | resistor | $5 \times 10^8$ ohms, 350 KV |
| 64 | resistor | $10^7$ ohms, 10 KV |
| 66 | switch | 2000 A, 10 KV |
| 68 | switch | 2000 A, 350 KV |
| 70 | inductance | 50 micro Henries, 10 KV |
| 72 | switch | 10 KV |
| 74 | capacitor | 25 microfarads, 10 KV |
| 78 | power supply | 0–10 KV |
| 80 | switch | 1 A, 10 KV. |

As a specific example of operation, assume that, under normal conditions, 1,800 amperes is flowing through load 34 at a 200 kilovolt drop. This current flows through the closed serially connected first and second switches 66 and 68. Switch 72 is open and capacitor 74 has previously been charged from power supply 78. The crossed-field switching tubes 40, 42, and 43 are not conducting because, for one reason, they have no voltage drop thereacross.

Figure 3:
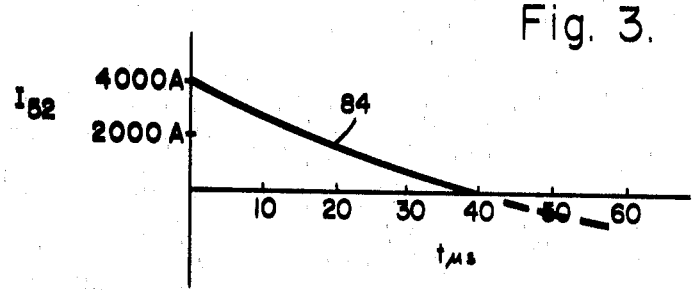
FIG. 3 is an exemplary graph showing the decrease in current through the first in-line switch at the beginning of the current transfer portion of the circuit breaker cycle.
Figure 4:
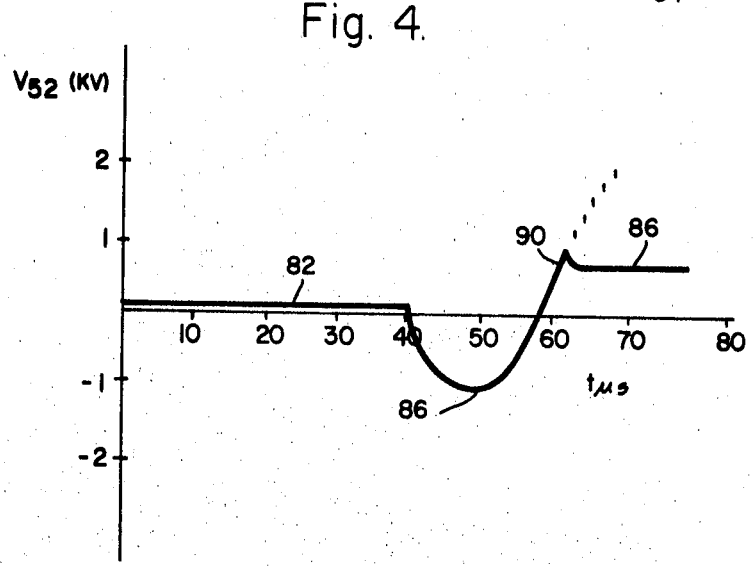
FIG. 4 is a graph showing the voltage across the first line switch of the interruptor during the current transfer portion of the circuit breaker cycle.

Assuming now that a fault occurs, such as is caused by closure of switch 32, or by fault of one branch to ground, the results of that fault are detected by voltage and/or current changes. Upon detection of such a fault, one or both of circuit breakers 22 and 24 are actuated. Both of these circuit breakers are the same and, thus, the actuation of only circuit breaker 22 need be described. Actuation is initiated by signaling switch 66 to open. When switch 66 is fully open and arcing, it is time zero in FIGS. 3 and 4. Switch 66 has been described as a vacuum relay. Vacuum relays continue to arc, so long as the current exceeds the chopping current (<100 A). FIG. 4 illustrates the arc voltage 82.

Switch 72 is closed at time zero. It is capable of carrying a high pulse current, at least equal to the current through first switch 66. An ignitron is suitable. The resonant discharge of capacitor 74 through inductance 70 progressively reduces current flow in switch 66 from the peak fault current of 4,000 amps at time zero to zero at 40 microseconds, as illustrated by curve 84 and FIG. 3. Since the capacitor 74 is initially at minus 6,000 volts with respect to 54, the applied voltage across switch 66 becomes negative-going, as illustrated by the curve portion 86 in FIG. 4. The shape and magnitude of the reverse voltage across first switch 66 is critical. If the rate of change of current at current zero is too fast, the arc in switch 66 will restrike. Similarly, if the rate of change of voltage across switch 66 is too high, the arc will restrike through the switch. The shape of the reverse voltage curve is produced by inductance 70, capacitor 74, capacitor 28, capacitor 58, as well as the initial charge on capacitor 74.

The reason for the reverse voltage shown in FIG. 4 is that, when the current zero is reached in switch 66, there is still some charge on capacitor 74. Capacitor 74 must have enough charge to commutate the peak fault current of 4,000 amperes. Thus, if a low line current is flowing in the circuit, when the circuit is opened, almost the full charge on capacitor 74 remains when the current reaches zero. Thus, operation at low line currents, but having a full fault current capability, is the most severe type of operation.

Once the arc in vacuum relay 66 is quenched, its voltage holdoff capability rapidly rises. The current flowing through second switch 68 and inductance 70 into capacitor 74 causes the voltage of capacitor 74 to rise. This voltage goes up to the conduction voltage of the crossed-field tubes 40, 42, and 43, illustrated by curve 86. This is normally 1,000 volts per tube, and several may need to be connected in series to have adequate holdoff properties. In any event, the voltage across lines 52 and 54 increases to the conduction voltage of the crossed-field tube (or series connection thereof), and then the voltage is clamped at that level. During this short time, the current into the breaker does not substantially change from the current peak (4,000 amperes, if the current transfer occurred at that value). The values of inductor 26 and capacitor 28 are such that, under these conditions, the voltage rises at the rate of 160 volts per microsecond, as capacitors 28, 58, and 74 are charged by the incoming current. It is this positive voltage that enables the crossed-field tubes to conduct, when at conduction voltage.

Once the conduction voltage is reached, current flow through second switch 68 is all transferred to the impedance-increasing circuit 38. Switch 68 is then opened or could have been previously opened and had been conducting in the arc mode. If it had been previously opened, this cessation of current flow therethrough causes the stopping of switch arcing. Of course, there may be a plurality of switches in series represented by the single second switch 68, the number in series being dependent upon the required voltage holdoff. In any event, they are all deionized by the cessation of current flow.

The voltage is then clamped at the voltage drop through crossed-field tube 40 for a sufficient length of time to permit second switch 68 to attain its full voltage holdoff capability. In this illustration, with surges at 1.7 times rated voltage, the peak holdoff capability of second switch 68 must be at least 340 KV, minus the holdoff capability of switch 66 (10 KV). At a later time, switch 72 can be opened, and capacitor 74 can be recharged for subsequent operation.

One problem that may arise from the circuitry and operation described above is related to the discharge of positive over-voltage on capacitor 74. This problem may occur after first switch 66 is opened. The capacitor 74 with its inductor 70 produces a current zero in switch 66 by closure of switch 72. This causes deionization and nonconduction of first switch 66. Then charging current flows through switch 68, inductor 70, and switch 72 to charge capacitor 74. Even if switches 68 and 72 are open, they are presumably still conducting through arcing. In some cases, the first crossed-field tube 40 does not immediately conduct upon the potential difference between buses 52 and 54 reaching the conduction voltage thereof. This is because of the statistical probabilities in initiating the cascading breakdown into a Penning discharge mode in the crossed-field tube 40. This means that the potential of bus 52 with respect to bus 54 rises to a level greater than the voltage drop of the conducting crossed-field tube 40. In any event, inductor 70 causes this voltage buildup, at least to a slight degree. The built-up voltage on capacitor 74 discharges through the now complete circuit of switch 72, inductor 70, second switch 68, and through crossed-field tube 40 when it starts to conduct. This current flow is in addition to the normal current through the crossed-field tube 40, and may produce an over-current. The circuit continuity producing this additional current can be eliminated by the insertion of a diode 88 adjacent to capacitor 74, see FIG. 2. The spike of this excess voltage is shown at 90 in FIG. 4. Another way to prevent this reverse current is to employ a triggered vacuum gap at switch 72. Such a gap would deionize sufficiently fast upon current reversal to prevent this reverse current flow.

The circuit breaker 22 is now ready to increase impedance in the line by increase in impedance in the impedance-increasing circuit 38, now that the in-line switches are open and the current is transferred. Impedance is increased by any one of the means taught in the above-referenced impedance-increasing circuits.

While this invention is described principally with respect to the offswitching of direct current, it is also useful in off-switching of alternating current circuits, where offswitching is accomplished before a natural current zero occurs as a result of the AC characteristics. Thus, while its principal utility is in a circuit where no natural current zero occurs, the circuit breaker, including the circuit of this invention, is useful in both DC and AC cases.

This invention having been described in its preferred embodiment, and a specific example of its operation having been given, it is clear that it is susceptible to numerous modifications and embodiments, including employment of components of other values, without the exercise of the inventive faculty. Accordingly, the scope of this invention is defined by the scope of the following claims.

What is claimed is:

1. A current transfer circuit for a circuit breaker for off-switching electric current, said circuit breaker comprising:
   first and second serially connected line switches having contacts serially connected in a circuit in which offswitching is desired and;
   impedance-increasing means connected in parallel with said line switches for progressively increasing impedance in said circuit, the improvement comprising:
   power means connected across said first line switch for causing a current zero in said first line switch after said contacts in said first line switch are opened to cause a sufficient increase in potential to transfer current from said line switches to said impedance-increasing means so that said first line switch and said power means need withstand only the initial voltage drop through said impedance-increasing means, said second line switch withstanding the balance of the potential across said impedance-increasing means as the impedance-increasing means increases impedance.

2. The circuit of claim 1 wherein voltage divider means is connected in parallel to said first and second switches to divide the voltage thereacross.

3. The circuit of claim 2 wherein said voltage divider means comprises first and second serially connected resistors and first and second capacitors respectively connected in parallel to each other and said first and second switches.

4. The circuit of claim 1 wherein said first line switch is fast-opening and said second line switch has sufficient voltage holdoff capacity when open to hold off the voltage across said circuit breaker.

5. The circuit of claim 4 wherein said first switch is a vacuum relay.

6. The circuit of claim 4 wherein said power means comprises a capacitor and an inductor serially connected in parallel across said first line switch.

7. The circuit of claim 6 wherein a power supply is connected across said capacitor to charge said capacitor so that capacitor discharge through said inductor causes a current zero in said first line switch.

8. The circuit of claim 7 wherein said first and second line switches are connected in series between a rectifier and a load, and a capacitor is connected to said rectifier so that, upon opening of said first line switch, said capacitor limits the rate of voltage rise applied to said first line switch.

9. The circuit of claim 1 wherein said impedance-increasing means comprises at least one electronic switch capable of off-switching while direct current flows therethrough, a resistor connected to said electronic switch, said electronic switch and said resistor being connected to said line switch means to maintain voltage across said line switch means at reduced value during opening of said line switch means.

10. The circuit of claim 9 wherein voltage divider means is connected in parallel to said first and second switches to divide the voltage thereacross.

11. The circuit of claim 10 wherein said voltage divider means comprises first and second serially connected resistors and first and second capacitors respectively connected in parallel to each other and said first and second switches.

12. The circuit of claim 1 wherein there are a plurality of electronic switches, and a separate resistance is connected to each of said plurality beyond the first of said electronic switches.

13. The circuit of claim 12 wherein said first line switch is fast-opening and said second line switch has sufficient voltage holdoff capacity when open to hold off the voltage across the circuit breaker.

14. The circuit of claim 13 wherein said power means comprises a capacitor and an inductor serially connected in parallel across said first line switch.

15. The circuit of claim 14 wherein a power supply is connected across said capacitor to charge said capacitor.

16. The circuit of claim 15 wherein said first and second line switches are connected in series between a rectifier and a load, and a capacitor is connected to said rectifier so that, upon opening of said circuit breaker, said capacitor limits the rate of voltage rise applied to said line switches.

* * * * *